United States Patent [19]

Chotai

[11] Patent Number: 5,907,805
[45] Date of Patent: May 25, 1999

[54] TELECOMMUNICATIONS SYSTEM

[75] Inventor: Sunil Chotai, Ipswich, United Kingdom

[73] Assignee: British Telecommunications Public Limited Company, London, United Kingdom

[21] Appl. No.: 08/673,474

[22] Filed: Jul. 1, 1996

Related U.S. Application Data

[63] Continuation of application No. 08/272,537, Jul. 11, 1994, abandoned.

[30] Foreign Application Priority Data

May 27, 1994 [EP] European Pat. Off. .............. 94303839

[51] Int. Cl.⁶ ...................................................... H04Q 7/20
[52] U.S. Cl. ........................... 455/414; 455/432; 379/209
[58] Field of Search ..................................... 455/412–414, 455/416, 417, 432, 436; 379/67, 88, 177–179, 182, 185, 187, 209, 266, 309

[56] References Cited

U.S. PATENT DOCUMENTS

| | | | |
|---|---|---|---|
| 3,956,595 | 5/1976 | Sobarski | 379/209 |
| 4,901,340 | 2/1990 | Parker et al. | 379/60 |
| 4,953,204 | 8/1990 | Cuschleg, Jr. et al. | 379/266 |
| 5,025,468 | 6/1991 | Sikand | 379/67 |
| 5,134,652 | 7/1992 | Brown et al. | 379/266 |
| 5,166,974 | 11/1992 | Morganstein et al. | 379/266 |
| 5,278,898 | 1/1994 | Cambray et al. | 379/266 |
| 5,311,574 | 5/1994 | Livanos | 379/67 |
| 5,329,583 | 7/1994 | Jurgensen et al. | 379/266 |
| 5,432,846 | 7/1995 | Norio | 379/266 |
| 5,535,331 | 7/1996 | Emery et al. | 379/58 |

FOREIGN PATENT DOCUMENTS

| | | |
|---|---|---|
| 0481683 | 4/1992 | European Pat. Off. . |
| 56-043838 | 4/1981 | Japan . |
| 56-43838 | 4/1981 | Japan . |
| 56-115046 | 8/1981 | Japan . |
| 56-115046 | 9/1981 | Japan . |
| 58-134542 | 8/1983 | Japan . |
| 58-1345432 | 8/1983 | Japan . |
| 5-145964 | 6/1993 | Japan . |
| 5145964 | 6/1993 | Japan . |

OTHER PUBLICATIONS

Brini et al, "International Roaming in Digital Cellular Networks", International Switching Symposium 1992, vol. 1, Oct. 25, 1992, Yokohama, JP, pp. 132–136.

Nacon et al, "New Custom Calling Services", ICC '79 International Conference On Communications, vol. 1, Jun. 10, 1979, Boston, MA, pp. 3.2.1–3.2.5.

Fujioka et al, "Hierarchical and Distributed Information Handling for UPT", IEEE Network, vol. 4, No. 6, Nov. 1990, New York, US, pp. 50–60.

8439 IEEE Personal Communications, 1(1994) 1st Quarter, No. 1, New York, NY "Two User Location Strategies For Personal Communications Services", Seshadri Mohan, Ravi Jain, pp. 42–50.

*Primary Examiner*—Dwayne D. Bost
*Assistant Examiner*—Nay A. Maung
*Attorney, Agent, or Firm*—Nixon & Vanderhye, P.C.

[57] ABSTRACT

In a telephone network, e.g. a cellular radio system, after a transaction at the connection management layer CM has ended, for example at the end of a telephone call, the lower layers are not automatically released. If another connection is to be set up on ending of the current call, e.g. a voice message or 'Call Completion to Busy Subscriber' arrangement, a flag F is set in the connection management system CM. The status of the flag F is used to determine if the signalling connection towards a termination B should be kept or released immediately. Depending on the status of the flag F different actions are taken in the network. The connection is maintained for a predetermined interval.

42 Claims, 4 Drawing Sheets

TELECOMMUNICATIONS SYSTEM

This is a continuation of application Ser. No. 08/272,537 filed Jul. 11, 1994 now abandoned.

FIELD OF THE INVENTION

This invention relates to telecommunications systems, and in particular to the management, at the end of a call, of signalling connections between a telephone termination and a network. The invention is particularly suited to mobile systems, such as cellular radio systems.

BACKGROUND OF THE INVENTION

In a telecommunications system, when the network recognises that a call has been terminated (normally by one of the parties going "on-hook") the connection is released. This then allows those network elements, which were used by the call to be used by other resources. For example, in a cellular radio environment the radio channel allocated to the call is released so that it can be used by other mobile units to make or receive calls.

For example, in conventional cellular radio systems, when a connection management transaction (for example a speech or a data call) ends, the call control protocol carries out the normal message exchanges to clear the connections. The signalling connections are then also automatically released via appropriate message exchanges from the lower protocol layers.

Similarly, when a mobility management transaction (for example periodic location update) ends, the lower layers are then also automatically released via appropriate message exchanges from the lower protocol layers.

A number of services are available from modern telecommunications systems to assist the maker of a failed call attempt. For example a message may be left for the unavailable user in a voice mailbox. 'Call Completion to Busy Subscriber' (CCBS) services are also known in which the system is arranged such that if a caller attempts to call an engaged line it informs that caller when the line becomes free and invites him to make another attempt. When a party ends a call, the signalling and traffic links to that party are released. If one of these services is in use the mobile switching centre must then determine the location of the mobile unit, page it, re-authenticate it, and re-establish the connection to perform the additional service. At busy times, the connection may no longer be available, having been seized by another call. This would lead to the 'Call Completion to Busy Subscriber' failing, or appearing to the caller to do so, as the new call attempt would fail. In the case of message services, there is an increased possibility that the unit will have moved out of range, or will have been switched off, before the voice message can be sent, resulting in a delay in receiving the message.

SUMMARY OF THE INVENTION

According to a first aspect of the invention, there is provided a telecommunications system for selectively interconnecting a plurality of network terminals, comprising means for establishing a communications link with an individual network terminal so that a call can be established to or from that terminal, means for releasing the communications link upon termination of a call from or to that terminal, means for indicating whether a further call to the terminal is to be made, and means for maintaining all or part of the communications link if such a further call is indicated.

According to a second aspect of the invention there is provided a method of operating a telecommunications system to control means for release of a communications link to a first network termination at the end of a call, wherein if a further call to the termination is to be made, all or part of the communications link is maintained.

The term 'call' is used in this specification to mean any communication between the network termination and the rest of the system, including control functions such as registration updates.

In a preferred embodiment the connection is maintained for a predetermined delay period, which may be selectable according to the type of further call.

The indication means may be settable in response to a text or voice message being stored in a message facility, or may be settable in response to an initial call attempt by a second termination to which an indication is sent that the first termination has completed a call.

The telecommunications system may be a cellular radio system. Such systems allow control of the communications link to be transferred from one control centre to another, either during a call or as a result of a registration update, as the mobile unit moves. In a preferred embodiment information on whether the communications link is to be maintained at the end of a call may be transferred as part of such a location update, together with any information required to support the service.

According to a third aspect of the invention there is provided a cellular radio system having a plurality of control means for establishing radio communication with one or more network terminals, the control means being arranged to transfer control of radio communication from one control means to another, and having means to store data to support a call service to the network terminal, wherein means are provided to transfer such data from a first control means to a second control means when the control of radio communication is transferred from the first control means to the second control means.

According to a fourth aspect of the invention there is provided a method of operating a cellular radio system, in which data to support a call service is transmitted to a first control means associated with a destination mobile unit, the data is stored by the first control means, and if control of the destination mobile unit is transferred to a second control means such data is transmitted from the first control means to the second control means and stored by the second control means.

This allows all relevant call context information to be transferred from the previous to new intelligent switching nodes serving the mobile user when a mobile user roams in the network. Such information could include the identity of the maker of a call attempt so that he can be alerted to complete a CCBS service, the nature of the call (speech or data) and the time of the attempt (to control a time-out on the CCBS service, and/or to include in a text message).

Many modern systems utilise the concepts of protocol layers in the line with the Open System Interconnection (OSI) principles to help manage complexity of large communications systems.

Protocols between peer entities are necessary for communications between the entities. Protocols can be layered with each layer allocated particular functions, for example the Data Link layer provides reliable transmission facilities making use of error detection and correction.

During a communication instance between two remote applications, several protocol layers are involved in complex systems. Each layer has its own peer to peer relationship and utilise services from lower layers to provide enhanced services to the layer above.

When the transactions between applications running in remote nodes finish, the communications facilities between the nodes are normally released in an orderly fashion. Each communication layer terminates the peer to peer protocol relationship, starting with the highest protocol layer. Once all the protocol layers have cleared, communications connection is automatically released.

The invention introduces a new concept of separating the release of the signalling connections associated with the Connection Management (CM) from those controlling Mobility Management (MM) entities. In particular, the release of the CM and MM and the lower layer connections is separated. The release of the MM and the corresponding lower layers is managed by a new control element or flag, referred to below as the Maintain Connection Indicator (MCI) flag. After a transaction at the CM layer has ended, for example at the end of a telephone call, the lower layers are not automatically released. The status of the MCI flag is used to determined if the signalling connection towards a Mobile Station (MS) is kept or released immediately. Depending on the status of the MCI flag different actions are taken in the network. A new concept of supervising the maintained signalling connection is also introduced. The flag is under the control of a supervision timer referred as the Connection Maintained Protection (CMP) timer.

This technique of maintaining the MM connection for use by another transaction can be used to improve the quality of some services and to improve the network efficiency in supporting these services. Some typical applications include:

Call Completion to Busy Subscriber (CCBS)

Here, when the called party B becomes free after ending an existing call, an indication is sent to the calling (A) party to re-attempt the original call. Thus, it is predictable that the A party will attempt to set-up a call within a short time after party B has completed an existing call. If a MM connection is maintained in this case, a faster call set-up can be achieved by eliminating the need to page the mobile unit, authenticate the called B subscriber and cipher the radio connection.

Short Message Service (SMS)

In the event that a Mobile Station has been out of contact with the network when a Mobile Terminated SMS text message is sent, a message waiting indicator is set in the network to enable it to deliver the SMS message when the MS next makes contact. Such messages are used, for example, to indicate to a user that there is a message waiting in a Voice Message Centre (VMC).

Voice Message Service (VMS)

Alternatively, the Voice Message Centre may itself be alerted that the mobile station is available to receive a voice message, and initiate a call attempt to the mobile station itself.

When a Mobile Station establishes contact with the network again, it would normally carry out a MM Specific transaction (e.g. IMSI Attach, Periodic Update, Location Update) to inform the network about its availability for incoming services. Once the MM specific procedure is completed, the MM connection could be kept, if indicated by the MCI flag, for transferring any SMS messages to the MS.

The use of the technique described above will lead to improvements in the quality of some services offered to the customers. In particular, some service response times perceived by the customer will be improved by eliminating network delay resulting from unnecessary signalling.

It will also benefit the network by improving the network performance achieved as a result of eliminating unnecessary processing of redundant signalling.

DESCRIPTION OF THE DRAWINGS

Preferred embodiments of the invention will now be described by way of example with reference to the accompanying drawings, in which.

DESCRIPTION OF PREFERRED EMBODIMENTS

Figure 1:
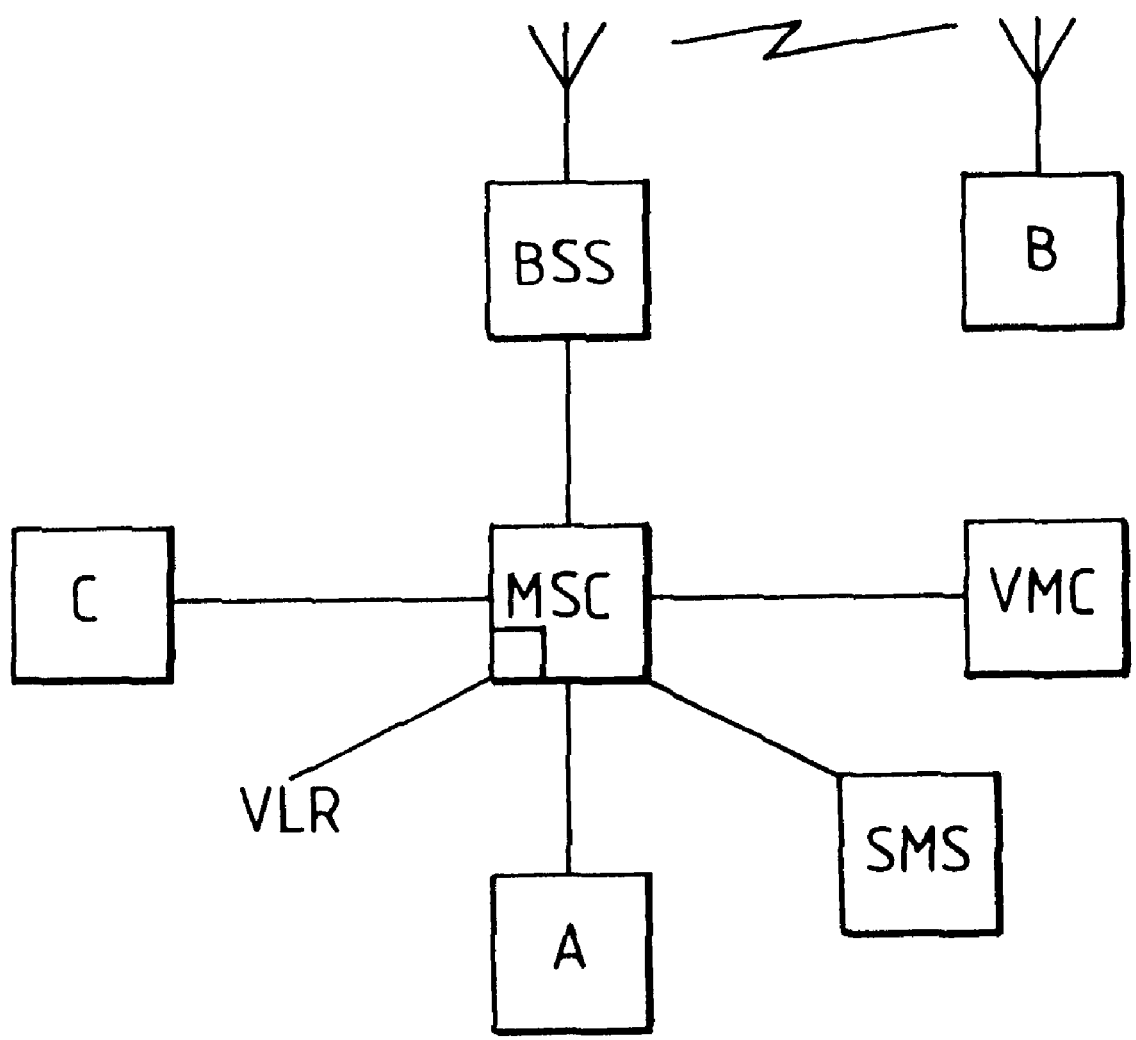
FIG. 1 shows the elements of a telecommunications system incorporating the invention.
Figure 2A:
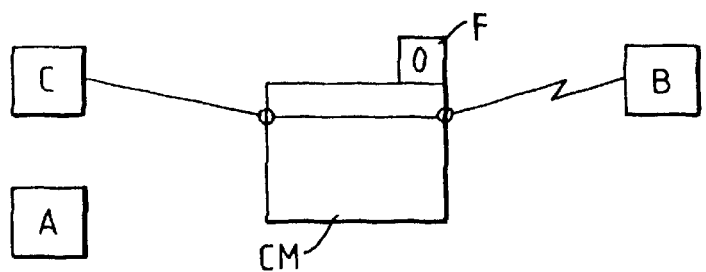
FIGS. 2a–2f are diagrams showing how the system of FIG. 1 functions to support a CCBS service.
Figure 2B:
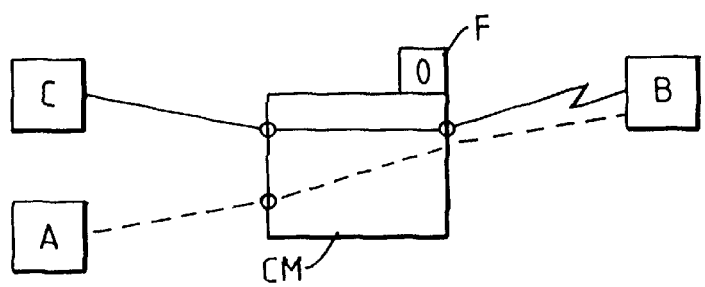
Figure 2C:
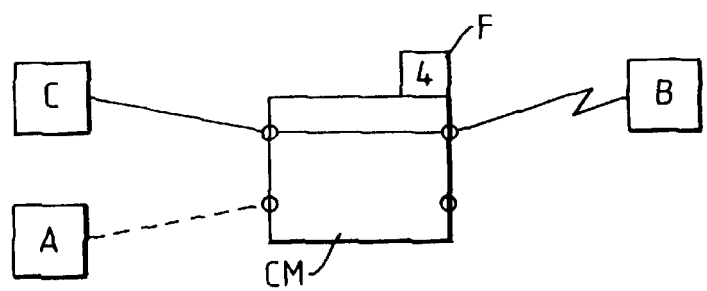
Figure 2D:
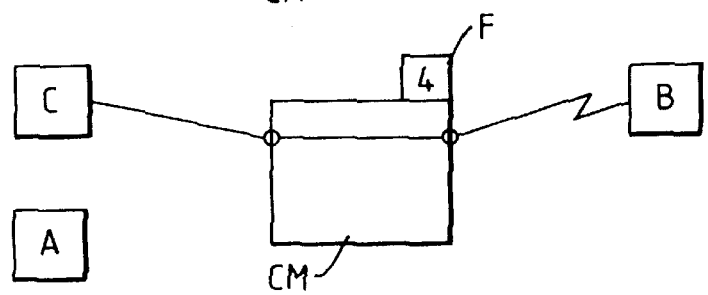
Figure 2E:
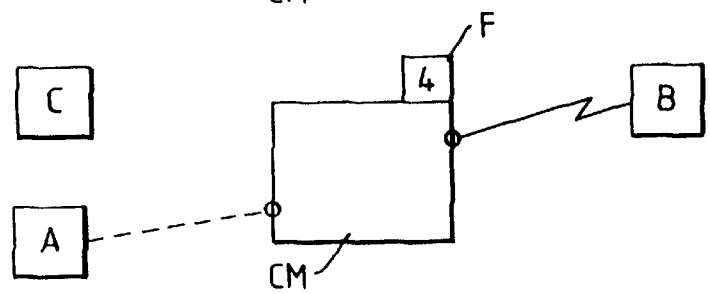
Figure 2F:
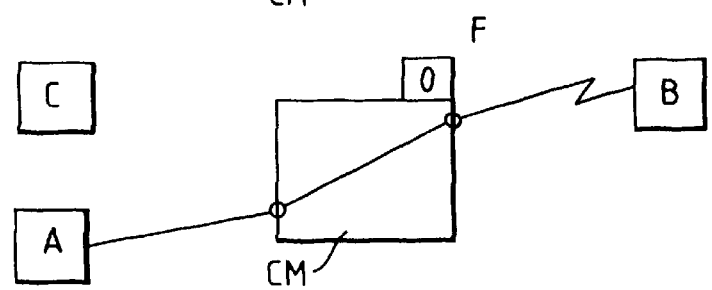
Figure 3A:
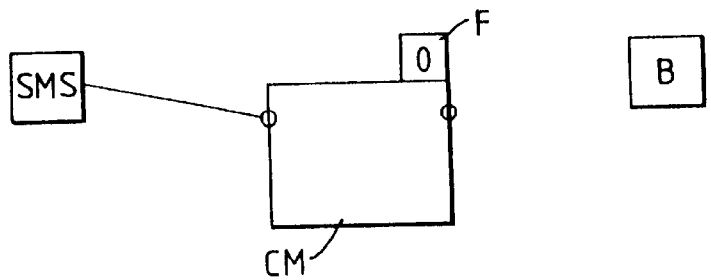
FIGS. 3a–3f are diagrams showing how the system of FIG. 1 functions to support an SMS service.
Figure 3B:
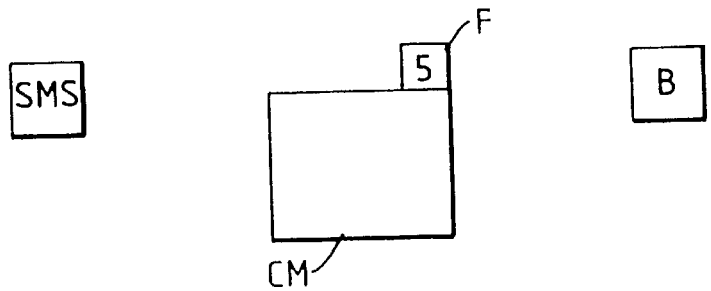
Figure 3C:
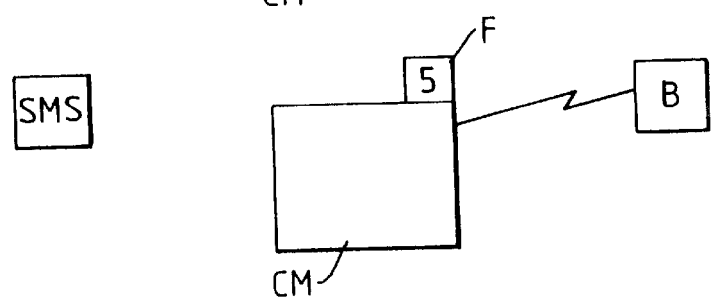
Figure 3D:
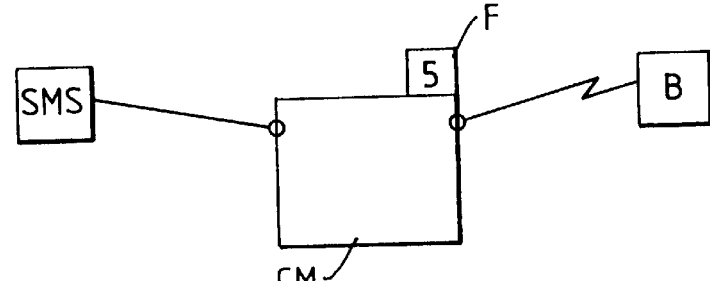
Figure 3E:
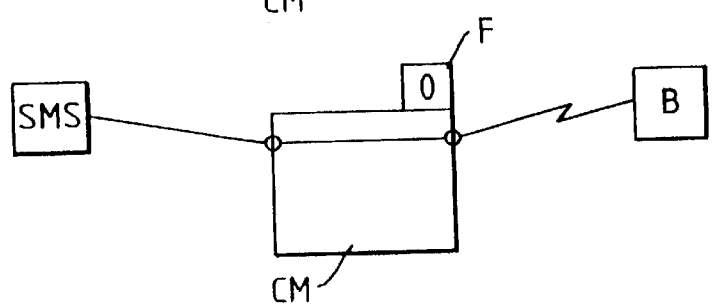
Figure 3F:
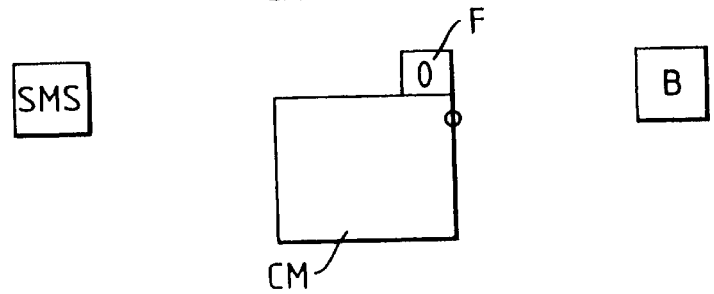
Figure 4A:
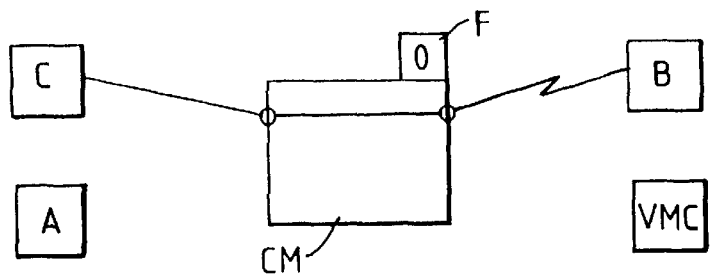
FIGS. 4a–4f are diagrams showing how the system of FIG. 1 functions to support a VMS service.
Figure 4B:
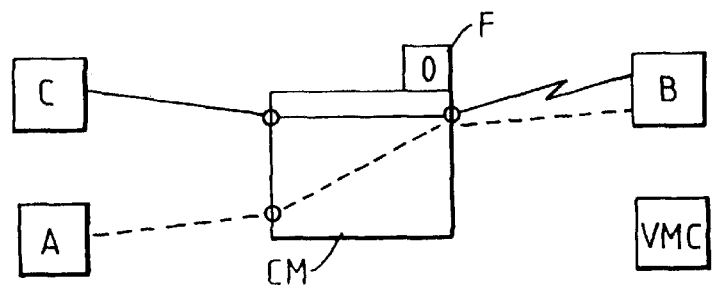
Figure 4C:
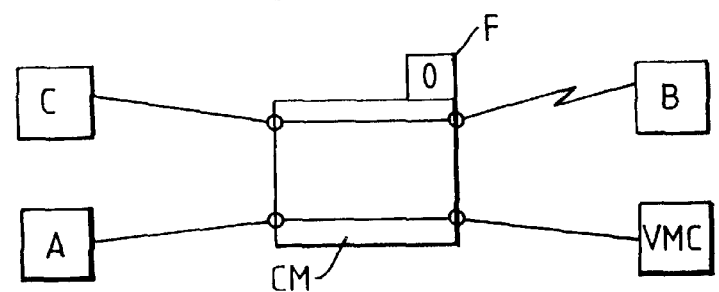
Figure 4D:
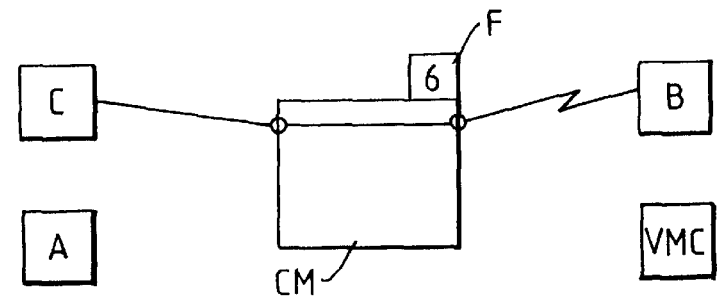
Figure 4E:
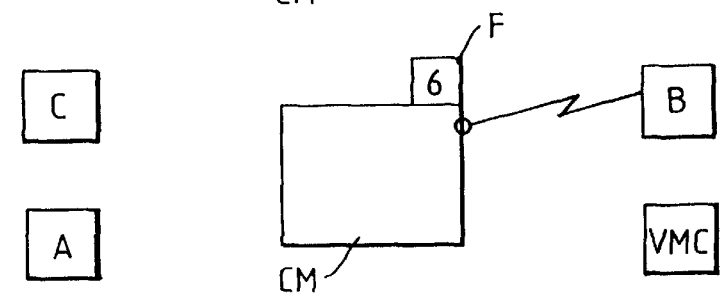
Figure 4F:
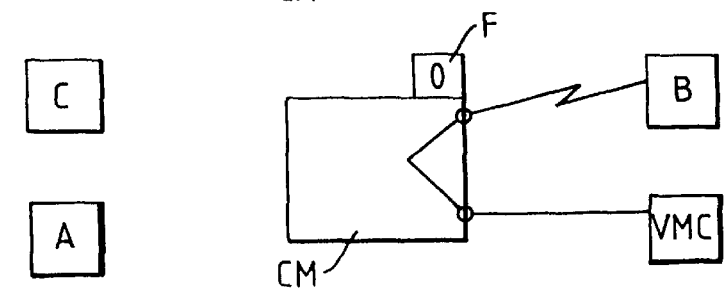

FIG. 1 shows the elements of a simple telecommunications system. A mobile unit B can be put in radio contact with a base station system (BSS). This is in turn connected to a mobile switching centre (MSC) and the Visited Location Register VLR which stores details of mobile stations currently registered with the mobile switching centre. Calls can be made between unit B and other system users A, C. If mobile unit B cannot be reached because the unit is switched off or engaged on another call, calls from users A, C can be diverted to a Voice Message Centre (VMC). A Short Message Service facility (SMS) is connected through the mobile switching centre MSC, which can store text messages for later transmission to the users.

In the description below the term Connection Management (CM) is used to include Call Control (CC), Supplementary Service (SS) and Short Message (SMS) entities and protocols.

The Maintain Connection Indicator (MCI) is used as a basis for decision making on whether to maintain an existing Mobility Management signalling connection with the Mobile Station after the existing user of the Connection Management layer ceases the need for a CM connection.

The MCI variable (flag) can take several distinct values each indicating a different statues. One of the values (zero) is used to indicate that the MM connection does not need to be kept and can be released immediately. The other values are used to indicate that a connection needs to be kept for use by other users within (and possibly above) the Connection Management layer.

It is useful to supervise the MM connection to ensure that it is released after a predetermined period if it is not used. This timer would protect against any possible abnormal events. It may be useful to have different time-out values for different applications.

The MCI status could be coded as a flag taking two possible values:

one indicating that the MM connection and lower layers to be released immediately; and the other indicating that the MM connection is kept for other transactions.

For each MCI status where a MM connection has to be kept, a Connection Maintained Protection timer may be associated with it. To provide flexibility, four different timer values (including zero) are assignable for each MCI state. The timer value would depend on the associated service.

The MCI status and the associated CMP timer could be coded using one octet as shown in Table 1 below.

TABLE 1

| Maintain Connection Indicator (MCI) Status | | | | | | | | Associated CMP Timer | | Meaning of MCI status |
|---|---|---|---|---|---|---|---|---|---|---|
| 8 | 7 | 6 | 5 | 4 | 3 | 2 | 1 | | | <== octet bit position |
| 0 | 0 | 0 | 0 | 0 | 0 | 0 | 0 | | | Connection released immediately |
| x | x | x | x | x | 1 | 0 | 0 | | | Connection kept for Call Control entity. |
|   |   |   |   |   |   | 0 | 1 | | | |
|   |   |   |   |   |   | 1 | 0 | | | |
|   |   |   |   |   |   | 1 | 1 | | | |
| x | x | x | x | 1 | x | 0 | 0 | | | Connection kept for Supplementary Service entity. |
|   |   |   |   |   |   | 0 | 1 | | | |
|   |   |   |   |   |   | 1 | 0 | | | |
|   |   |   |   |   |   | 1 | 1 | | | |
| x | x | x | 1 | x | x | 0 | 0 | | | Connection kept for Short Message Service entity. |
|   |   |   |   |   |   | 0 | 1 | | | |
|   |   |   |   |   |   | 1 | 0 | | | |
|   |   |   |   |   |   | 1 | 1 | | | |
| x | x | 1 | x | x | x | 0 | 0 | | | Connection kept for Voice Message Service entity. |
|   |   |   |   |   |   | 0 | 1 | | | |
|   |   |   |   |   |   | 1 | 0 | | | |
|   |   |   |   |   |   | 1 | 1 | | | |
| x | 1 | x | x | x | x | | | | | Reserved |
| 1 | x | x | x | x | x | | | | | Reserved |

In this table 'x' indicates that the status may be '0', or it may be '1', the latter case indicating that two entities are flagged. If this is the case the timer value is the longest one corresponding to one of the flagged entities.

The connection is released if it is not utilised before the CM timer expires.

At the end of the release of a Connection Management transaction, the lower layers are not released automatically. The status of the MCI flag is first examined at the end of an existing CM transaction. Depending on the status of the MCI flag different actions are taken in the network.

If the status of the MCI flag is zero indicating that no new transactions are waiting to use the existing connection, the connection is released by sending a CLEAR COMMAND message towards the Base Station System which in turn releases the Radio Resources (RR) connection to the Mobile Station. After the response from the Base Station System is received, the connection towards the Base Station System is released in the normal way.

If the status of the MCI flag F indicates that there are other transactions which could make use of the connection, the existing signalling connection to the Mobile Station M is not released. The connection is maintained for use by another transaction. A Connection Maintained Protection (CMP) timer may be started to supervise the maintenance of the connection until its new transaction starts utilising the maintained connection.

If a new transaction has been aborted and it fails to utilise the maintained MM connection, the MM connection is released after the expiry of the CMP timer.

FIGS. 2, 3 and 4 each show six stages in the progress of the call management for three different services. The connection-management system (CM) makes the various connections between the users A, B, C, the Short Message Service facility SMS and the voice message centre VMC. The term "connection management system" is used in this specification to describe the actual network entities shown in FIG. 1 and the communication protocols between them.

FIG. 2 shows the procedure for the Call Completion to Busy Subscriber (CCBS) service. Initially (step a) user B is in communication with user C. In step b) user A attempts to communicate with user B as shown by the dotted line. Since user B is busy the connection management system CM offers user A the CCBS facility and, if accepted, the connection management system CM is configured to monitor user B, and a flag F is set (step c). The flag value depends on the nature of the supplementary service. In this example the element '4' of the MCI octet if flagged indicating that a supplementary service has been requested.

The call between parties B and C continues (step d). When it finishes (step e), in response to the condition of flag F the signalling connection from the mobile switching station to user B is kept open for a short period determined by the flag value F and it associated timer. This allows the connection management system CM to alert user A to the availability of user B so that a call back can be carried out (step f) without the need to set up a completely new connection, including the allocation of a channel, between the mobile switching centre MSC and user B. The flag F is then reset to zero.

Whilst the Mobile Station (User B) is out of radio contact with the network, information related to the CCBS service and the MCI of the flag is stored in the MSC/VLR. When the user B next makes contact with the network (e.g. Periodic Update, IMSI attach, Location Update) the stored information in the MSC/VLR is used to perform different actions in the network, for example, keeping the MM connection for use by other transactions. When contact is made with the network by User B, this could be at the same MSC/VLR or a different MSC/VLR. In the case where the MSC/VLR is different the information related to the CCBS services and the MCI flag can be transferred from the previous MSC/VLR to the new MSC/VLR. This allows User B to roam freely between different MSC/VLRs in the network without loss in service quality.

The previous MSC/VLR needs to be aware that the user B has moved to a new MSC/VLR service area in order that it can transfer all relevant call context information. This event is detected at the previous MSC/VLR with the reception of the standard CANCEL LOCATION message within the Mobile Application Part (MAP) protocol from the Home Location Register (HLR). Once this event is detected at the previous MSC/VLR, all call context information for user B including CCBS and MCI flag is transferred to the new MSC/VLR using a signalling protocol e.g. the MAP protocol. The transfer will be through the Home Location register of user B. The new MSC/VLR will process the call context information including the CCBS and MCI flag information in the same way as the first MSC/VLR. Thus the user B will receive the same benefits at the new MSC/VLR.

FIG. 3 shows the procedure for the Short Message Service. Such services are used to indicate to a user that some action is required of him, such as retrieving messages from a voice message centre which have been received whilst the user has been out of contact, for example because he was out of range of a base station or had switched his terminal off. The Short Message facility may attempt to deliver a message towards user B at any time, but the user B may not be within radio contact when a message is to be delivered (step a). The SMS service centre is alerted that the message has not been delivered to user B and the service centre stores the message for future delivery. In step b) the MCI octet element '5' is flagged to indicate that a message is stored in the SMS facility. In step c) user B communicates with the network, e.g. to make a registration update or to make a call attempt. The MCI flag indicates that the link so established should be maintained to allow the short message to be passed to the user B (step d) In step e) the message is transmitted to user B and the flag value F reset to zero. When the message has been transmitted the connection to user B can be dropped (step f) immediately, if it is not being used by other transactions.

FIG. 4 shows an alternative procedure in which the Voice Message Centre itself initiates the response. In this example the user B is initially unavailable because he is engaged on another call. Initially (step a)) user B is in communication with user C. In step b) user A attempts to communicate with user B as shown by the dotted line. Since user B is busy the connection management system CM diverts the call from A to a voice message centre VMC. A flag F is set. The flag value depends on the nature of the supplementary service. In this example the MCI octet element '6' is flagged indicating that a message is held in the voice message centre VMC. In step e) the call between users B and C is terminated. However, in response to the condition of flag F the signalling connection from the mobile switching station to user B is kept open for a short period determined by the flag value F. This allows the connection management system CM to make voice message connection (step f) without the need to set up a completely new connection, including the allocation of a channel, between the mobile switching centre MSC and user B.

The embodiments described above are described in relation to a cellular radio system. However, similar principles are applicable to any communications system in which resources are shared, such that not all the terminations can use a resource simultaneously. Such resources include not only radio channels, either in a cellular system or as part of a point-to point fixed link, but also other fixed links such as wire pairs in a party (shared) line or channels in a multiplex system in a trunk network. In a fixed system the control protocols can be simpler as a given termination will always be under the control of the same control means, so there is no need to provide for handover of MCI 'flag' conditions from one control means to another, as is necessary for the cellular radio embodiment described above.

I claim:

1. A telecommunications system for selectively interconnecting a plurality of network terminals, comprising:
    means for establishing a communications link with a network terminal so that a transaction can be established to or from that terminal,
    means for releasing the communications link with said network terminal upon termination of a transaction from or to said network terminal;
    indicating means settable to indicate whether an attempt to make a further transaction with said network terminal has been or is to be made, without a communications link for the attempted further transaction being maintained with a source of said further transaction;
    means responsive to the setting of the indicating means for preventing release of all or part of the communications link with said network terminal;
    means for detecting termination of a first transaction from or to said network terminal; and
    means for attempting to establish the previously attempted further transaction when the first transaction is terminated.

2. A telecommunications system according to claim 1, comprising timer means for causing the communications link to be released after a predetermined delay period.

3. A telecommunications system according to claim 2, wherein the settable indicating means indicates the type of further transaction to be made, and the delay period of the timer means is selectable according to the type of transaction indicated.

4. A telecommunications system according to claim 1, having a message facility for storing messages to a first terminal when a connection to the first terminal cannot be established, wherein the indicating means is settable in response to a message being stored in the message facility.

5. A telecommunications system according to claim 4 wherein the message facility includes means for storing voice messages.

6. A telecommunications system according to claim 4 wherein the message facility includes means for storing text messages.

7. A telecommunications system according to claim 1, having settable signaling means for signaling to a second network terminal that a first network terminal has completed a transaction, the signaling and indicating means being settable in response to a transaction attempt by said second network terminal to said first network terminal.

8. A telecommunications system according to claim 1, wherein the telecommunications system is a cellular radio system.

9. A method of operating a telecommunications system to control release of a communications link to a first network terminal at the end of a transaction, wherein if an attempt to make a further transaction involving the first network terminal has been made, without maintaining a communications link for the further attempted transaction with a source of said further transaction, preventing release of all or part of the communications link with the first network terminal, detecting termination of a first transaction from or to the first network terminal and attempting to establish the previously attempted further transaction when the first transaction is terminated.

10. A method according to claim 9, including maintaining the communications link for a predetermined delay period.

11. A method according to claim 10, wherein the delay period is selected according to the type of further transaction to be made.

12. A method according to claim 9, including maintaining the communications link if a message to the first network termination is stored in a message facility.

13. A method according to claim 9, including setting an indicating means in response to a transaction attempt from a second network terminal.

14. A method according to claim 13, including sending a signal to the second network terminal when the first transaction ends.

15. A method according to claim 11, wherein the telecommunications system is a cellular radio system.

16. A telecommunications system according to claim 2, comprising means for maintaining a communications link for a further predetermined delay period after termination of such further transaction to the terminal, in order to allow a further transaction to be initiated from the terminal.

17. A method according to claim 11, including maintaining the communication link for a further predetermined delay period after the further transaction to the terminal, in order to allow a further transaction to be initiated from the terminal.

18. A telecommunications system according to claim 1, comprising a plurality of switching centers for establishing communication links with one or more network terminals, so that a network terminal can establish a communication link through different switching centers at different times, at least a first and a second of the switching centres having register means to store data associated with the network terminals relating to the activation state of one or more functions associated with the terminals, wherein means are provided to transfer such data from the register means of the first switching center to the register means of the second switching center when communication with the network terminal is transferred from the first switching center to the second switching center.

19. A telecommunications system according to claim 18 having a buffer register for storing data from the register of the first switching center, in the event that communication with the network terminal is first transferred to a further switching center not having a register capable of storing the data, and means for transmitting the data stored in the buffer register to the register of the second switching center when communication with the network terminal is transferred to said second switching center.

20. A method according to claim 9, in which network terminals can establish communication links with different switching centers at different times, and in which data relating to the activation state of one or more functions associated with the network terminals is stored in a register associated with a first switching center through which a respective terminal is currently in communication, wherein when communication with the network terminal is transferred to a second switching center transmitting said data to a register associated with the second switching center.

21. A method according to claim 20, wherein if communication with the network terminal is first transferred to a further switching center not having an associated register capable of storing the data, storing the data in a buffer register, and when communication with the network terminal is transferred to the second switching center, transmitting the data to the register associated with said second switching center.

22. A telecommunications system comprising:
a plurality of switching centers, including plural foreign switching centers, for establishing communication links with one or more network terminals, so that a network terminal can establish a communication link through different switching centers at different times, at least a first and a second of the foreign switching centers including register means to store data associated with the network terminals relating to the activation state of one or more functions relating to the status of calls, call attempts in progress associated with the terminals and further transactions attempted with said terminal during a time when said terminal is unavailable for completing said transaction, wherein means are provided to transfer such data from the register means of the first foreign switching center to the register means of the second foreign switching center when communication with the network terminal is transferred from the first foreign switching center to the second foreign switching center.

23. A telecommunications system according to claim 22, having a buffer register for storing data from the register of the first foreign switching center, in the event that communication with the network terminal is first transferred to a further switching center not having a register capable of storing the data, and means for transmitting the data stored in the buffer register of the second foreign switching center when communication with the network terminal is transferred to said second foreign switching center.

24. A telecommunications system as claimed in claim 22, further comprising means for releasing the communications link upon termination of a transaction from or to that terminal, indicating means settable to indicate whether a further transaction is to be made involving the terminal, and means responsive to the setting of the indicating means for preventing release of all or part of the communications link.

25. A telecommunications system according to claim 24, comprising timer means for causing the communications link to be released after a predetermined delay period.

26. A telecommunications system according to claim 25, wherein the settable indicating means indicates the type of further transaction to be made, and the delay period of the timer means is selectable according to the type of transaction indicated.

27. A telecommunications system according to claim 25, comprising means for maintaining a communications link for a further predetermined delay period after termination of such further transaction to the terminal, in order to allow a further transaction to be initiated from the terminal.

28. A telecommunications system according to claim 22, having a message facility for storing messages to a first terminal when a connection to the first terminal cannot be established, wherein the register means is settable in response to a message being stored in the message facility.

29. A telecommunications system according to claim 28, wherein the message facility includes means for storing voice messages.

30. A telecommunications system according to claim 29, wherein the message facility includes means for storing text messages.

31. A telecommunications system according to claim 24, having settable signaling means for signaling to a second network terminal that a first network terminal has completed a transaction, the signaling and indicating means being settable in response to a transaction attempt by said second network terminal to said first network terminal.

32. A telecommunications system according to claim 22, wherein the telecommunications system is a cellular radio system.

33. A method of operating a telecommunications system in which network terminals can establish communication links with different switching centers at different times, and in which data relating to the activation state of one or more functions relating to the status of calls and call attempts in progress associated with the network terminals is stored in a register associated with a first switching center through which a respective terminal is currently in communication, wherein when communication with the network terminal is transferred to a second switching center transmitting said data to a register associated with the second switching center.

34. A method according to claim 33, wherein if communication with the network terminal is first transferred to a further switching center not having an associated register capable of storing the data, storing the data in a buffer register, and when communication with the network terminal is transferred to the second switching center, transmitting the data to the register associated with said second switching center.

35. A method according to claim 33, in which the data is used to control means for release of a communications link to a network terminal at the end of a transaction wherein if a further transaction to the terminal is to be made, preventing release of all or part of the communications link.

36. A method according to claim 35, including maintaining the link for a predetermined delay period.

37. A method according to claim 36, wherein the delay period is selected according to the type of further transaction to be made.

38. A method according to claim 36, including maintaining the link for a further predetermined delay period after the further transaction to the terminal, in order to allow a further transaction to be initiated from the terminal.

39. A method according to claim 37, including maintaining the communication link if a message to the first network terminal is stored in a message facility.

40. A method according to claims 33, including setting an indicating means in response to a transaction attempt from a second terminal.

41. A method according to claim 40, including sending a signal to the second terminal when the first transaction ends.

42. A method according to claim 35, wherein the telecommunications system is a cellular radio system.

* * * * *